(12) United States Patent
Lowe et al.

(10) Patent No.: US 7,166,643 B2
(45) Date of Patent: *Jan. 23, 2007

(54) HYDROGEN RECOVERY FROM HYDROCARBON SYNTHESIS PROCESSES

(75) Inventors: Clifford M. Lowe, Moraga, CA (US); Daniel Chinn, Concord, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/794,084

(22) Filed: Mar. 8, 2004

(65) Prior Publication Data

US 2005/0197410 A1 Sep. 8, 2005

(51) Int. Cl.
 *C07C 27/00* (2006.01)

(52) U.S. Cl. .................. 518/726; 518/700; 518/722; 518/709

(58) Field of Classification Search ........... 518/700, 518/722, 726, 709
See application file for complete search history.

(56) References Cited

U.S. PATENT DOCUMENTS

| | | |
|---|---|---|
| 3,852,207 A | 12/1974 | Stangeland et al. |
| 3,904,513 A | 9/1975 | Fisher et al. |
| 4,157,294 A | 6/1979 | Iwao et al. |
| 4,348,486 A | 9/1982 | Calvin et al. |
| 4,568,663 A | 2/1986 | Mauldin |
| 4,963,165 A | 10/1990 | Blume et al. |
| 5,082,551 A | 1/1992 | Reynolds et al. |
| 5,260,239 A | 11/1993 | Hsia |
| 5,268,344 A | 12/1993 | Pedrick et al. |
| 5,283,216 A | 2/1994 | Mitchell |
| 5,844,005 A | 12/1998 | Bauman et al. |
| 6,043,288 A | 3/2000 | DeGeorge et al. |
| 6,103,773 A | 8/2000 | Wittenbrink |
| 6,147,126 A | 11/2000 | DeGeorge et al. |

(Continued)

FOREIGN PATENT DOCUMENTS

EP 0609079 8/1994

(Continued)

OTHER PUBLICATIONS

Newsome, D.W., "The Water-Gas Shift Reaction", *Catal. Rev.-Sci. Eng.* 21(2):275-318 (1980).

(Continued)

*Primary Examiner*—J. Parsa
(74) *Attorney, Agent, or Firm*—Buchanan Ingersoll & Rooney PC

(57) ABSTRACT

The invention relates to a process for producing a hydrogen-rich stream from a hydrogen-depleted stream. More particularly, the invention relates to a hydrocarbon synthesis process, by way of example, a Fischer Tropsch process, from which both hydrocarbons and high purity hydrogen are obtained. The process comprises contacting the hydrogen-depleted stream with a reverse-selective membrane to provide a $CO_2$-enriched permeate and a hydrogen-containing retentate. The high purity hydrogen is produced from the hydrogen-containing retentate. The high purity hydrogen thus obtained may be used in a process selected from the group consisting of upgrading hydrocarbons produced from the hydrocarbon synthesis process, hydrotreating a natural gas stream, recycling to the hydrocarbon synthesis reaction unit, high purity hydrogen production, catalyst rejuvenation, and combinations thereof.

11 Claims, 4 Drawing Sheets

U.S. PATENT DOCUMENTS

| | | |
|---|---|---|
| 6,179,995 B1 | 1/2001 | Cash et al. |
| 6,258,860 B1 | 7/2001 | Weedon et al. |
| 6,361,583 B1 | 3/2002 | Pinnau et al. |
| 6,562,111 B2 * | 5/2003 | Edlund et al. .................... 96/4 |
| 6,572,679 B2 | 6/2003 | Baker et al. |
| 6,572,680 B2 | 6/2003 | Baker et al. |
| 6,579,331 B1 | 6/2003 | Ho |
| 6,589,303 B1 | 7/2003 | Lokhandwala et al. |
| 6,627,666 B1 * | 9/2003 | Pedersen .................... 518/721 |

FOREIGN PATENT DOCUMENTS

| | | |
|---|---|---|
| EP | 0700708 A | 3/1996 |
| WO | WO02/051744 | 7/2002 |

OTHER PUBLICATIONS

UK Search report dated Aug. 31, 2005.

* cited by examiner

Figure 1 Stream Summary

| Stream | 1 | 2 | 3 | 4 | 5 | 6 | 7 | 8 | 9 | 10 |
|---|---|---|---|---|---|---|---|---|---|---|
| Total Molar Rate (lbmole/hr) | 1.04E+04 | 2.78E+03 | 7.60E+03 | 7.18E+03 | 1.48E+04 | 1.48E+04 | 9.69E+03 | 6.82E+03 | 9.60E+03 | 2.86E+03 |
| Total Mass Rate (lb/hr) | 2.73E+05 | 1.02E+05 | 1.72E+05 | 1.29E+05 | 3.01E+05 | 3.01E+05 | 2.09E+05 | 2.03E+05 | 3.05E+05 | 5.77E+03 |
| Total Standard Vapor Rate (ft3/hr) | 3.94E+06 | 1.06E+06 | 2.88E+06 | 2.73E+06 | 5.61E+06 | 5.61E+06 | 3.68E+06 | 2.59E+06 | 3.64E+06 | 1.09E+06 |
| Temperature (F) | 158 | 158 | 158 | 660 | 579 | 623 | 158 | 90 | 108 | 110 |
| Pressure (psia) | 297 | 44 | 297 | 298 | 292 | 287 | 277 | 44 | 44 | 267 |
| Vapor Mole Fraction | 1 | 1 | 1 | 1 | 1 | 1 | 1 | 1 | 1 | 1 |
| Composition (mol%) | | | | | | | | | | |
| $H_2O$ | 1.40 | 4.96 | 0.10 | 100.00 | 48.65 | 35.53 | 1.62 | 2.30 | 3.07 | 0.00 |
| $H_2$ | 24.10 | 12.58 | 28.32 | 0.00 | 14.56 | 27.67 | 42.23 | 17.98 | 16.42 | 100.00 |
| CO | 22.00 | 2.25 | 29.23 | 0.00 | 15.03 | 1.91 | 2.91 | 4.14 | 3.59 | 0.00 |
| $CO_2$ | 31.80 | 69.25 | 18.09 | 0.00 | 9.30 | 22.41 | 34.20 | 48.55 | 54.55 | 0.00 |
| $N_2$ | 2.60 | 0.24 | 3.46 | 0.00 | 1.78 | 1.78 | 2.72 | 3.86 | 2.81 | 0.00 |
| Methane | 12.70 | 3.71 | 15.99 | 0.00 | 8.22 | 8.22 | 12.54 | 17.81 | 13.72 | 0.00 |
| Ethane | 1.10 | 0.70 | 1.25 | 0.00 | 0.64 | 0.64 | 0.98 | 1.39 | 1.19 | 0.00 |
| Propane | 1.00 | 1.06 | 0.98 | 0.00 | 0.50 | 0.50 | 0.77 | 1.09 | 1.08 | 0.00 |
| n-Butane | 3.30 | 5.25 | 2.59 | 0.00 | 1.33 | 1.33 | 2.03 | 2.88 | 3.57 | 0.00 |
| Total (%) | 100 | 100 | 100 | 100 | 100 | 100 | 100 | 100 | 100 | 100 |

Figure 2

Figure 3 Stream Summary

| Stream | 21 | 22 | 23 | 24 | 25 | 26 | 27 | 28 | 29 | 30 |
|---|---|---|---|---|---|---|---|---|---|---|
| Total Molar Rate (lbmole/hr) | 1.04E+04 | 1.10E+04 | 2.14E+04 | 2.14E+04 | 1.25E+04 | 3.36E+03 | 9.09E+03 | 6.23E+03 | 9.59E+03 | 2.86E+03 |
| Total Mass Rate (lb/hr) | 2.73E+05 | 1.98E+05 | 4.72E+05 | 4.72E+05 | 3.11E+05 | 1.25E+05 | 1.86E+05 | 1.81E+05 | 3.05E+05 | 5.77E+03 |
| Total Standard Vapor Rate (ft3/hr) | 3.94E+06 | 4.17E+06 | 8.11E+06 | 8.11E+06 | 4.73E+06 | 1.28E+06 | 3.45E+06 | 2.36E+06 | 3.64E+06 | 1.09E+06 |
| Temperature (F) | 158 | 660 | 625 | 778 | 158 | 158 | 158 | 90 | 114 | 110 |
| Pressure (psia) | 297 | 298 | 292 | 292 | 277 | 44 | 277 | 44 | 44 | 267 |
| Vapor Mole Fraction | 1 | 1 | 1 | 1 | 1 | 1 | 1 | 1 | 1 | 1 |
| Composition (mol%) | | | | | | | | | | |
| H2O | 1.40 | 100.00 | 52.13 | 42.67 | 1.62 | 5.33 | 0.25 | 0.36 | 2.11 | 0.00 |
| H2 | 24.10 | 0.00 | 11.70 | 21.16 | 36.31 | 12.86 | 44.99 | 19.70 | 17.30 | 100.00 |
| CO | 22.00 | 0.00 | 10.68 | 1.22 | 2.09 | 0.14 | 2.81 | 4.11 | 2.71 | 0.00 |
| CO2 | 31.80 | 0.00 | 15.44 | 24.90 | 42.73 | 75.13 | 30.74 | 44.87 | 55.48 | 0.00 |
| N2 | 2.60 | 0.00 | 1.26 | 1.26 | 2.17 | 0.13 | 2.92 | 4.26 | 2.81 | 0.00 |
| Methane | 12.70 | 0.00 | 6.17 | 6.17 | 10.58 | 2.04 | 13.74 | 20.06 | 13.74 | 0.00 |
| Ethane | 1.10 | 0.00 | 0.53 | 0.53 | 0.92 | 0.40 | 1.11 | 1.62 | 1.19 | 0.00 |
| Propane | 1.00 | 0.00 | 0.49 | 0.49 | 0.83 | 0.63 | 0.91 | 1.32 | 1.08 | 0.00 |
| n-Butane | 3.30 | 0.00 | 1.60 | 1.60 | 2.75 | 3.33 | 2.53 | 3.70 | 3.57 | 0.00 |
| Total (%) | 100 | 100 | 100 | 100 | 100 | 100 | 100 | 100 | 100 | 100 |

Figure 4

HYDROGEN RECOVERY FROM HYDROCARBON SYNTHESIS PROCESSES

FIELD OF THE INVENTION

The invention relates to a process for producing a hydrogen-rich stream from streams comprising a low concentration of hydrogen, i.e., a hydrogen-depleted stream. More particularly, the invention relates to a hydrocarbon synthesis process, by way of example, a Fischer Tropsch process, from which both hydrocarbons and high purity hydrogen are produced.

BACKGROUND OF THE INVENTION

There are many processes known in the art for converting hydrocarbon sources such as natural gas, coal, coke, into more valuable hydrocarbon products. A typical conversion process involves first converting the hydrocarbon source into synthesis or syngas gas, which is a mixture of water, carbon dioxide, carbon monoxide and hydrogen. If the hydrocarbon source is natural gas, a catalytic reforming reaction is utilized to make syngas. If the source is residual oil or a solid feed, partial oxidation or gasification is used. The syngas then may be used as a feedstock for producing a wide range of chemicals, including combustible liquid fuels, methanol, ammonia, acetic acid, dimethyl ether, oxo alcohols, and isocyanates.

Remote natural gas assets can be converted into conventional transportation fuels, chemical feedstocks, and lubricants via the initial production of syngas. The Fischer Tropsch process is the conventional route to convert the syngas into transportation fuels and lubricants. Alternatively, natural gas may be converted into syngas followed by methanol synthesis with the methanol utilized to produce a wide variety of chemicals.

In particular, a Fischer Tropsch synthesis reaction may be used to synthesize higher molecular weight hydrocarbon products from synthesis gas. In Fischer Tropsch synthesis reactions, synthesis gas is converted to hydrocarbons by contact with a Fischer Tropsch catalyst under reactive conditions. The products from a Fischer Tropsch process may range from $C_1$ to $C_{200+}$ with a majority in the $C_5$–$C_{100+}$ range. The Fischer Tropsch synthesis reaction can be conducted in a variety of reactor types including, for example, fixed bed reactors containing one or more catalyst beds, slurry reactors, fluidized bed reactors, or a combination of different type reactors.

Similarly, methanol can be produced from a wide range of hydrocarbon feedstocks by initially converting the feedstock into synthesis gas by reforming or gasification. Methanol synthesis can then be achieved via a catalytically-enhanced reaction.

Hydrocarbon synthesis processes typically require a source of hydrogen gas for use in the process. By way of example, natural gas feeds to the synthesis gas generator may require hydrotreating prior to introduction into the synthesis gas generator. In addition, Fischer Tropsch products, while they are highly paraffinic, are typically upgraded by one or more hydroconversion processes to provide more valuable products. Examples of hydroconversion processes include hydrotreating, hydrocracking, hydroisomerization, and hydrofinishing. In these hydroconversion/hydrotreating processes, expensive hydrogen gas is consumed.

Conventional sources of hydrogen gas are expensive. The hydrogen gas may be obtained from a conventional steam methane reformer; however, the equipment is expensive and the process requires a natural gas feed, which instead could be used to generate additional syngas and ultimately more valuable higher molecular weight products. Hydrocarbon synthesis processes generate gas streams comprising low concentrations of hydrogen. However, the hydrogen is in such low concentrations that typically, these gas streams are sent to fuel gas systems.

As hydrocarbon synthesis processes require hydrogen gas and typical sources for hydrogen gas are expensive, there have been attempts to develop more economical and efficient sources of hydrogen gas for use in these hydrocarbon synthesis processes. By way of example, U.S. Pat. Nos. 6,043,288 and 6,103,773 and WO 02/051744 describe processes for producing hydrogen from a synthesis gas feed. U.S. Pat. No. 5,082,551 describes a process for the separation of $H_2$-rich gas from the effluent from a hydroconversion zone and U.S. Pat. No. 6,147,126 describes processes for using the $H_2$-rich tail gas from a hydroconversion process for at least one of (i) hydrocarbon synthesis reaction catalyst rejuvenation, (ii) the hydrocarbon synthesis, and (iii) hydrogen production. U.S. Pat. No. 5,844,005 describes using a hydrogen containing tail gas from a hydrocarbon synthesis reactor as a hydrogen containing catalyst rejuvenating gas. If CO is present in the hydrogen containing tail gas, the CO content is less than 10 mole % of the gas and the $H_2$ to CO mole ratio is greater than 3:1.

Accordingly, there is a need in the art for an economical and efficient source of hydrogen gas. As such, there is a need in the art for processes for providing high purity hydrogen gas from gas streams comprising low concentrations of hydrogen. In addition, there is a need in the art for a hydrocarbon synthesis process in which the hydrogen required for hydrotreating the natural gas feed and/or upgrading the products is economically and efficiently provided from the hydrocarbon synthesis process itself such that the use of hydrogen from an outside source is minimized. This invention provides such processes.

SUMMARY OF THE INVENTION

The present invention relates to a process for providing a hydrogen-rich stream. The process comprises performing a hydrocarbon synthesis process using syngas and isolating a gaseous stream comprising hydrogen from the hydrocarbon synthesis process. The gaseous stream comprising hydrogen is contacted with a reverse-selective membrane to provide a $CO_2$-enriched permeate and a hydrogen-containing retentate, the retentate is passed through a water gas shift reactor to provide a hydrogen-containing stream; and the hydrogen-containing stream is passed through a pressure swing adsorption unit to provide a hydrogen-rich stream comprising greater than 90 vol. % hydrogen.

In another embodiment, the present invention relates to a process for providing a hydrogen-rich stream. The process comprises performing a hydrocarbon synthesis process using syngas and isolating a gaseous stream comprising hydrogen from the hydrocarbon synthesis process. The gaseous stream comprising hydrogen is passed through a water gas shift reactor to provide a hydrogen-containing stream; the hydrogen-containing stream is contacted with a reverse-selective membrane to provide a $CO_2$-enriched permeate and a hydrogen-containing retentate; and the hydrogen-containing retentate is passed through a pressure swing adsorption unit to provide a hydrogen-rich stream comprising greater than 90 vol. % hydrogen.

In yet another embodiment, the present invention relates to a process for providing a hydrogen-rich stream. The process comprises performing a hydrocarbon synthesis process, isolating a hydrogen-depleted stream from the hydrocarbon synthesis process, and isolating a hydrogen-rich stream comprising greater than 90 vol. % hydrogen from the hydrogen-depleted stream by a process comprising contacting the hydrogen-containing stream with a reverse-selective membrane.

In a further embodiment, the present invention relates to a process for upgrading a hydrocarbon product stream comprising contacting the hydrocarbon product stream with a hydrogen-rich stream, wherein the hydrogen-rich stream is isolated from a stream comprising less than 40% vol. hydrogen.

In yet a further embodiment, the present invention relates to an integrated Fischer Tropsch process. The process comprises performing a Fischer Tropsch process using syngas to provide a hydrocarbon product stream and a hydrogen-depleted stream; isolating a hydrogen-rich stream from the hydrogen-depleted stream; and upgrading at least a portion of the hydrocarbon product stream by reacting it with at least a portion of the hydrogen-rich stream.

In another embodiment, the present invention relates to a process for providing a hydrogen-rich stream. The process comprises performing a hydrocarbon synthesis process using syngas to provide at least one hydrocarbon stream and a hydrogen-depleted stream. A hydrogen-containing stream is isolated from the hydrogen-depleted stream by a process comprising contacting with a reverse-selective membrane and performing a water gas shift reaction, wherein the hydrogen concentration on a water-free basis of the hydrogen-containing stream is at least 5 vol. % greater than the hydrogen concentration on a water-free basis of the hydrogen-depleted stream. The hydrogen-containing stream is passed through a pressure swing adsorption unit to provide a hydrogen-rich stream comprising greater than 90 vol. % hydrogen.

BRIEF DESCRIPTION OF THE DRAWINGS

FIG. 2 provides Table II, which is a stream summary of the content of the gas streams from FIG. 1. The stream summary has been generated by computer modeling.

FIG. 4 provides Table III, which is a stream summary of the content of the gas streams from FIG. 3. The stream summary has been generated by computer modeling.

DETAILED DESCRIPTION OF THE INVENTION

Figure 1:
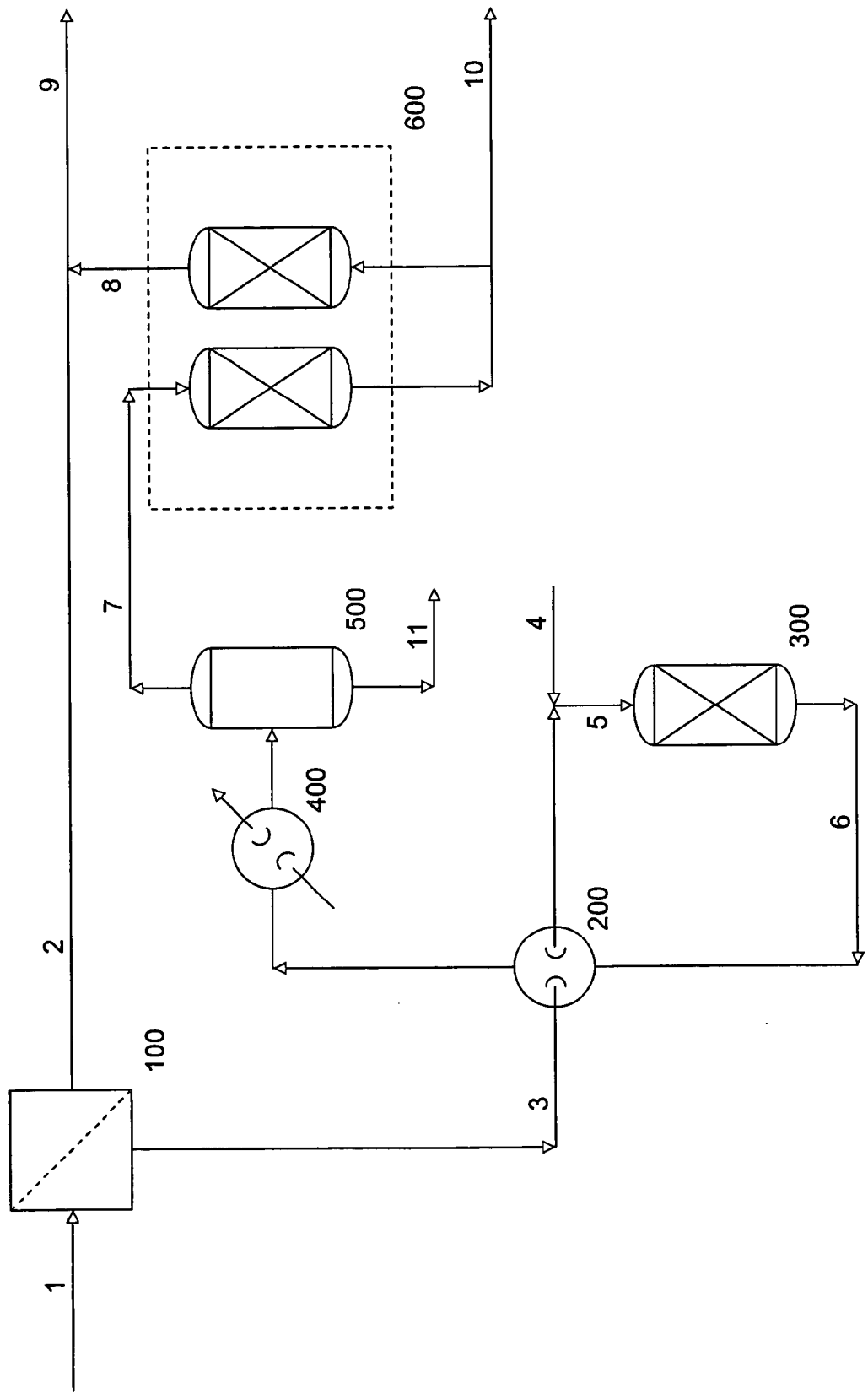
FIG. 1 is a schematic flow diagram of one embodiment of the invention.

According to the present invention, processes are provided for isolating a hydrogen-rich stream. Surprisingly, the processes of the present invention allow for the isolation of a hydrogen-rich stream from streams comprising a low concentration of hydrogen. Preferably, the hydrogen-depleted streams are isolated from a hydrocarbon synthesis process. Low concentrations of hydrogen typically prevent the use of pressure swing adsorption to recover hydrogen-rich streams. To function effectively, pressure swing adsorption typically requires a hydrogen feed with greater than 40 vol. % hydrogen. However, the processes of the present invention allow for the isolation of a hydrogen-rich stream from a hydrogen-depleted stream, in particular a stream comprising less than 40 vol. % hydrogen, preferably less than 35 vol. % hydrogen.

The processes for isolating a hydrogen-rich stream according to the present invention use methods for raising the concentration of hydrogen in the stream. These methods include using a reverse-selective membrane that is selectively permeable to carbon dioxide, and thus, separates carbon dioxide from the other components of the hydrogen-depleted gas stream.

Preferably, the processes of the present invention are used to isolate hydrogen-rich streams from streams produced in hydrocarbon synthesis processes, and the hydrogen-rich streams thus isolated can then be used in the hydrocarbon synthesis processes, thus providing an integrated process.

The hydrogen-rich streams isolated according to the processes of the present invention may be used for any purpose for which a high purity hydrogen gas is needed. By way of example, the hydrogen-rich streams can be used for a process selected from the group consisting of (i) upgrading a hydrocarbon product stream from the hydrocarbon synthesis process; (ii) hydrotreating a natural gas stream; (iii) recycling the hydrogen-rich stream to a hydrocarbon synthesis reaction unit; (iv) hydrogen production for uses outside the hydrocarbon synthesis process; (v) rejuvenating a hydrocarbon synthesis reaction catalyst; and (vi) combinations thereof.

Definitions

The following terms will be used throughout the specification and will have the following meanings unless otherwise indicated.

The hydrocarbon synthesis process refers to a series of process steps for the conversion of a hydrocarbon source, such as natural gas, heavy oil, and coal, into more valuable hydrocarbons. The hydrocarbon synthesis process first comprises converting the hydrocarbon source into synthesis gas or syngas. The synthesis gas is then converted into more valuable hydrocarbons by a hydrocarbon synthesis reaction. The hydrocarbon synthesis process may comprise one or more upgrading steps to upgrade the hydrocarbons into one or more salable hydrocarbonaceous products. Hydrocarbon synthesis processes may be used to produce a wide range of products, including combustible liquid fuels, methanol, acetic acid, dimethyl ether, oxo alcohols, and isocyanates. Hydrocarbon synthesis processes include Fischer Tropsch processes, methanol synthesis processes, and the like.

A hydrocarbon synthesis reaction refers to the reaction that converts synthesis gas into higher hydrocarbons. Hydrocarbon synthesis reactions include Fischer Tropsch synthesis reactions, methanol synthesis reactions, and the like.

Derived from a Fischer Tropsch process means that the feedstock, feed, product stream, or tail gas in question originates from or is produced at some stage by a Fischer Tropsch process.

A "Fischer Tropsch derived stream" or "Fischer Tropsch stream" means that the stream originates from or is produced at some stage by a Fischer Tropsch process.

Highly paraffinic means that the feedstock, blend stock, or product in question contains more than 70 weight % paraffins, preferably 80 weight % or greater paraffins, and most preferably 90 weight % or greater paraffins.

Syngas or synthsis gas is a mixture that includes both hydrogen and carbon monoxide. In addition to these species, water, carbon dioxide, unconverted light hydrocarbon feedstock and various impurities may also be present.

Permeate means the gas stream that selectively passes through the membrane. As such, the membrane is selectively permeable for the permeate.

Retentate means the gas stream that does not pass through the membrane and thus, remains on the feed side of the membrane. As such, the membrane is not selectively permeable for the retentate.

Reverse-selective membrane is a membrane that is selectively permeable to a more soluble gas component. According to the present invention, the reverse-selective membrane is selectively permeable to $CO_2$ and thus, the membrane selectively passes $CO_2$ while restricting passage of less soluble components in the original feed stream, including hydrogen.

$CO_2$-enriched permeate means the gas stream that passes through the reverse-selective membrane. The reverse-selective membrane is selectively permeable to $CO_2$, and as such, the membrane selectively passes $CO_2$ resulting in a gas stream that is enriched in $CO_2$ and depleted in the less soluble components of the original gas feed. It should be noted that the membrane is selectively permeable to $CO_2$. Selectively permeable indicates a higher selectivity for $CO_2$ in comparison to the less soluble components of the original gas feed; however, selectively permeable does not require a complete separation of the components of the original gas feed.

Hydrogen-containing retentate means the gas stream that does not pass through the membrane. The reverse-selective membrane is selectively permeable to $CO_2$, and as such, the membrane restricts passage of the less soluble gas components in the original feed, including hydrogen, resulting in a hydrogen-containing retentate. The hydrogen-containing retentate comprises hydrogen, as well as other components of the original gas for which the membrane is not selectively permeable. The membrane according to the present invention is selectively permeable to $CO_2$, and thus, the gas stream, which does not pass through the membrane, comprises hydrogen, as well as other components of the original gas for which the membrane is not selectively permeable. Selectively permeable indicates a higher selectivity for $CO_2$ in comparison to the less soluble components of the original gas feed; however, selectively permeable does not require a complete separation of the components of the original gas feed, and thus, the hydrogen-containing retentate may comprise residual $CO_2$ as well as hydrogen and the other components of the original gas for which the membrane is not selectively permeable.

Hydrogen-rich stream means a stream comprising greater than 90 vol. % hydrogen, preferably greater than 95 vol. % hydrogen, and more preferably greater than 99 vol. % hydrogen.

Hydrogen-depleted stream means a stream comprising less than 40 vol. % hydrogen, preferably less than 35 vol. % hydrogen, and more preferably less than 30 vol. % hydrogen.

Low value hydrogen streams are hydrogen-depleted streams and thus comprise less than 40 vol. % hydrogen, preferably less than 35 vol. % hydrogen, and more preferably less than 30 vol. % hydrogen.

Integrated Process means a process comprising a sequence of steps, some of which may be parallel to other steps in the process, but which are interrelated or somehow dependent upon either earlier or later steps in the total process. Thus, a feed to one step in an integrated process comprises a product from a preceding step in the process; alternatively, a product of a step in an integrated process is a feed, either alone or as a blend with other feeds, for one or more subsequent steps in an integrated process.

"Hydrocarbon or hydrocarbonaceous" means a compound or substance that contains hydrogen and carbon atoms, which may also include heteroatoms such as oxygen, sulfur or nitrogen.

All percentages herein are by volume unless otherwise stated.

The present invention provides processes for isolating a hydrogen-rich stream from a hydrogen-depleted stream. As provided above, the hydrogen-rich stream comprises greater than 90 vol. % hydrogen, preferably greater than 95 vol. % hydrogen, and more preferably greater than 99 vol. % hydrogen, and the hydrogen-depleted stream comprises less than 40 vol. % hydrogen, preferably less than 35 vol. % hydrogen. The processes of the present invention for isolating a hydrogen-rich stream use a reverse-selective membrane. According to the present invention, an initial gas stream (i.e., a hydrogen-depleted stream) is treated by a process comprising contacting the initial gas stream with a reverse-selective membrane.

In one embodiment, the processes for isolating a hydrogen-containing stream from a hydrogen-depleted stream comprise contacting with a reverse-selective membrane, performing a water gas shift reaction, and passing through a pressure swing adsorption unit. Contacting with a reverse-selective membrane and performing a water gas shift reaction are performed prior to passing through a pressure swing adsorption unit to raise hydrogen concentrations to acceptable levels for use of pressure swing adsorption for hydrogen recovery. The processes may further comprise removing water in a vapor-liquid separator prior to the pressure swing adsorption unit.

In an embodiment, the processes comprise contacting the initial gas stream with a reverse-selective membrane to provide a $CO_2$-enriched permeate and a hydrogen-containing retentate; passing the retentate through a water gas shift reactor to provide a hydrogen-containing stream; and passing the hydrogen-containing stream through a pressure swing adsorption unit to provide a hydrogen-rich stream. The process may further comprise passing the hydrogen-containing stream through a vapor-liquid separator to remove water prior to the pressure swing adsorption unit. Advantageously, the hydrogen-containing retentate is at elevated pressure since it does not pass through the membrane and thus does not require re-pressuring to complete the isolation process. Preferably, the hydrogen-containing retentate is at a pressure of $\geq$ about 100 psig, and more preferably $\geq$ about 200 psig.

In another embodiment, the processes of the present invention comprise passing the initial gas stream through a water gas shift reactor to provide a hydrogen-containing stream; contacting the hydrogen-containing stream with a reverse-selective membrane to provide a $CO_2$-enriched permeate and a hydrogen-containing retentate; and passing the hydrogen-containing retentate through a pressure swing adsorption unit to provide a hydrogen-rich stream. The process may further comprise passing the hydrogen-containing stream through a vapor-liquid separator to remove water prior to the reverse-selective membrane. Advantageously, the hydrogen-containing retentate is at elevated pressure since it does not pass through the membrane and thus does not require re-pressuring to complete the isolation process. Preferably, the hydrogen-containing retentate is at a pressure of $\geq$ about 100 psig, and more preferably $\geq$ about 200 psig.

Initial Gas Stream

The initial gas stream to the processes of the present invention comprises hydrogen. Advantageously, the processes of the present invention allow for isolation of a hydrogen-rich stream from initial streams that comprise a low concentration of hydrogen. As such, these initial gas streams are low value, hydrogen-depleted streams comprising less than 40 vol. % hydrogen, preferably less than 35 vol. % hydrogen, and more preferably less than 30 vol. % hydrogen. The initial gas streams may also comprise $CO_2$, CO, $H_2O$ (g), and gaseous $C_1$–$C_5$ hydrocarbons.

The initial gas stream may be isolated from any source from which a hydrogen-depleted stream may be obtained. Preferably, the hydrogen-depleted stream is isolated from a hydrocarbon synthesis process. In a hydrocarbon synthesis process, the hydrogen-depleted streams may be isolated from one or more processes that together provide such a low value hydrogen-containing stream. Preferably, the hydrogen-depleted stream is isolated from a source selected from the group consisting of (i) a tail gas from a hydrocarbon synthesis reaction unit; (ii) the syngas prior to performing the hydrocarbon synthesis reaction; (iii) a tail gas from an upgrading process; and (iv) combinations thereof. Preferably, at least a portion of the hydrogen-depleted stream is isolated from the tail gas from a hydrocarbon synthesis reaction unit.

As these initial gas streams, i.e., hydrogen-depleted gas streams, comprise less than 40 vol. % hydrogen, there is insufficient hydrogen content to produce a hydrogen-rich product by pressure swing adsorption. Surprisingly, a hydrogen-rich stream may be produced from these low value, hydrogen-depleted streams by employing methods to effectively raise the hydrogen content of the gas feed prior to pressure swing adsorption. These methods include contacting the initial gas feed with a reverse-selective membrane that is selectively permeable to carbon dioxide and performing a water gas shift reaction. After conducting these methods, the hydrogen content on a water-free basis of the resulting stream may be at least 5 vol. % greater than the hydrogen content on a water-free basis of the initial hydrogen-depleted gas stream.

Reverse-selective Membrane

The reverse-selective membrane, used in the processes of the present invention, is selectively permeable to carbon dioxide and relatively impermeable to the less soluble components of the original gas feed, including hydrogen and carbon monoxide. Therefore, when the initial gas stream is contacted with the reverse-selective membrane according to the processes of the present invention, a $CO_2$-enriched permeate and a hydrogen-containing retentate are provided. The $CO_2$-enriched permeate passes through the membrane and the hydrogen-containing retentate remains on the feed side of the membrane. As described above, advantageously, the hydrogen-containing retentate is at elevated pressure since it does not pass through the membrane and thus does not require re-pressuring to complete the isolation process. Preferably, the hydrogen-containing retentate is at a pressure of ≧about 100 psig, and more preferably ≧about 200 psig.

Reverse-selective membranes are rubbery membranes and they operate because bigger, more condensable molecules (i.e., more soluble molecules) are preferentially permeated. Solubility is the key factor that enables $CO_2$ to preferentially permeate over the less soluble components including $H_2$.

In contrast, most other typical membranes (i.e., "regularly-selective" membranes) are glassy membranes, and as such, smaller molecules diffuse much faster through the membrane than larger molecules. Diffusivity, rather than solubility, is the controlling factor for this type of membranes. In "regularly-selective" membranes, hydrogen will permeate across the membrane more readily resulting in a retentate containing $CO_2$.

Reverse-selective membranes, which are selectively permeable to carbon dioxide and are useful in the processes of the present invention, are available from Membrane Technology and Research, Inc. in Menlo Park, Calif. Reverse-selective membranes available from Membrane Technology and Research, which are selectively permeable to carbon dioxide, may be based on polyether-polyamide block copolymers. The permeation properties of these membranes are optimized for separating polar gases from nonpolar gases.

Membranes that are selectively permeable to carbon dioxide are available from Membrane Technology and Research, Inc. in Menlo Park, Calif. and have been described in U.S. Pat. Nos. 4,963,165; 6,361,583; 6,572,679; and 6,572,680 (assigned to Membrane Technology and Research), the contents of which are incorporated by reference in their entirety. Reverse-selective membranes that are selectively permeable to $CO_2$ preferably exhibit selectivities of $CO_2/H_2$ of up to 10.

The structure of the polyether-polyamide block copolymers of the reverse-selective membrane available from Membrane Technology and Research is as illustrated below:

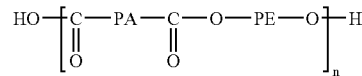

wherein PA is an aliphatic polyamide block and PE is a polyether block. As such, there is a repeat unit of polyether-polyamide block copolymers. The aliphatic polyamide (PA) units are those such as nylon 6 or nylon 12 and the polyether (PE) units are those such as polyethylene glycol or polytetramethylene glycol.

Water Gas Shift Reactor

Either prior to contact with the reverse-selective membrane or after such contact, the hydrogen-containing stream is passed through a water gas shift reactor. In the water gas shift reactor CO reacts with water vapor in the presence of a shift catalyst at reaction conditions effective to form a mixture of hydrogen and carbon dioxide. Water gas shift reaction conditions are well known to those of skill in the art. Shift catalysts include, for example, iron-based shift catalysts, copper-based shift catalysts, and nickel-based shift catalysts.

The iron-based catalysts are known as high temperature shift catalysts, and generally operate in the temperature range of 320–450° C. Copper based catalysts are known as low temperature catalysts, and generally operate in the temperature range of 200–250° C. Industrial shift converters can operate from atmospheric pressure to 8500 kPa, at CO concentrations between 3% and 80%.

Many other transition metals have been shown to demonstrate some shift activity. One which has received attention is the sulfided cobalt oxide-molybdenum oxide on alumina. Other catalysts, including cobalt Fischer Tropsch catalysts, are also known to have at least some shift activity.

In the processes according to the present invention a gas stream comprising CO and $H_2$ is fed into a water gas shift reactor with excess water vapor to provide a stream with increased hydrogen content. Providing water vapor in excess assists in driving the reaction to formation of hydrogen and carbon dioxide. After the water gas shift reaction excess water may be removed by cooling and passing the stream through a vapor-liquid separator.

Water gas shift reaction conditions are described, for example, in Newsome, David S., "The Water-Gas Shift Reaction," Catal. Rev.-Sci. Eng., 21 (2) pp 275–318 (1980).

Pressure Swing Adsorption

Contacting with a reverse-selective membrane and performing a water gas shift reaction are performed prior to passing through a pressure swing adsorption unit to raise hydrogen concentrations to acceptable levels for use of pressure swing adsorption for hydrogen recovery. To operate effectively, the hydrogen-containing gas feed to the pressure swing adsorption unit needs to comprise greater than about 40 vol. % hydrogen. The initial gas stream is contacted with a reverse-selective membrane and passed though a water gas shift reactor raising the volume percent of hydrogen on a water-free basis in the gas stream. After conducting these methods, the hydrogen content on a water-free basis of the resulting stream may be at least 5 vol. % greater than the hydrogen content on a water-free basis of the initial hydrogen-depleted gas stream. Therefore, surprisingly using the processes of the present invention a hydrogen-depleted stream may be used as the initial gas stream for providing a hydrogen-rich stream.

Pressure swing adsorption operates to purify the hydrogen-containing gas by removing contaminant gases and hydrocarbons. The hydrogen-containing gas, which is the feed to the pressure swing adsorption unit comprises, greater than 40 vol. % hydrogen for the unit to operate effectively. Higher concentrations of hydrogen result in higher hydrogen recovery efficiencies and better economics. Pressure swing adsorption systems are well known to those of skill in the art. They operate by selectively adsorbing the impurities from the gas. Desorption and regeneration of the adsorbent are accomplished by reducing the adsorptive capacity of the adsorbent by lowering the pressure and purging the adsorbent with a portion of the hydrogen-rich gas. Pressure swing adsorption allows more rapid sorption-desorption cycling than is possible in thermal swing adsorption.

A pressure swing cycle consists of: adsorption; depressurization; purge at low pressure; and repressurization. This cycle may be carried out using two or more beds of an adsorbent that are capable of selectively adsorbing impurities, such as methane, from a hydrogen-rich gas. Such adsorbents include molecular sieves, particularly zeolitic molecular sieves, silica gel, activated carbon, and mixtures thereof. The most efficient systems operate with more than two beds with one or more of the beds undergoing regeneration while the others are adsorbing. The hydrogen-rich gas is used as much as possible to purge and repressure other beds.

The purified hydrogen gas product, i.e., the hydrogen-rich stream, is taken from the pressure swing adsorption. As indicated above, the hydrogen content of this hydrogen-rich stream preferably is at least about 90% by volume, more preferably at least 95% by volume, and even more preferably at least 99% by volume. As indicated above, the hydrogen content of the feed gas to the pressure swing adsorption will be greater than about 40% by volume for the unit to operate effectively. At lower hydrogen concentrations, there is insufficient product hydrogen to regenerate the pressure swing adsorption beds. According to the processes of the present invention, a hydrogen-rich stream may be isolated from an initial gas stream comprising a low concentration of hydrogen (i.e., a hydrogen-depleted stream) by employing methods to raise the hydrogen content of the gas feed prior to pressure swing adsorption, as described above.

The hydrogen-rich product stream will typically be at substantially the same pressure as the gas entering the system, since there is usually very little pressure drop for the hydrogen through the pressure swing adsorption system for the hydrogen. The impurities leave the system by an "other gas" line. The impurities will typically exit the system at pressures ranging between atmospheric pressure and about 150 psig. The pressure of the removed gases is typically an important operating parameter of pressure swing adsorption systems. As a general rule, the lower this pressure, the higher the hydrogen recovery from the feed gas. Typically, the ratio of feed gas pressure to removed gas pressure will be maintained at about 4:1 or higher.

Hydrocarbon Synthesis Processes

Preferably, the hydrogen-depleted stream for use in the processes of the present invention is isolated from a hydrocarbon synthesis process.

A hydrocarbon synthesis process refers to a series of process steps for the conversion of a hydrocarbon source, such as natural gas, heavy oil, and coal, into more valuable hydrocarbons. The hydrocarbon synthesis process first comprises converting the hydrocarbon source into synthesis gas or syngas. The synthesis gas is then converted into more valuable hydrocarbons by a hydrocarbon synthesis reaction. The hydrocarbon synthesis process may comprise one or more upgrading steps to upgrade the hydrocarbons into one or more salable hydrocarbonaceous products. Hydrocarbon synthesis processes may be used to produce a wide range of products, including combustible liquid fuels, methanol, acetic acid, dimethyl ether, oxo alcohols, and isocyanates. Hydrocarbon synthesis processes include Fischer Tropsch processes, methanol synthesis processes, and the like.

The hydrocarbon synthesis reaction is the reaction for converting synthesis gas into higher hydrocarbons. Hydrocarbon synthesis reactions include Fischer Tropsch synthesis reactions, methanol synthesis reactions, and the like.

Methanol synthesis reactions and methanol synthesis processes are well known to those of skill in the art. In a methanol synthesis process, syngas is derived from a hydrocarbon source. The syngas is then converted to methanol by contact with a catalyst under reactive conditions. Reaction conditions and catalysts for performing methanol synthesis reactions are well known to those of skill in the art. Methanol synthesis reactions are disclosed in, for example, U.S. Pat. Nos. 4,348,486 and 6,258,860, the contents of which are incorporated by reference in their entirety.

Fischer Tropsch synthesis reactions and Fischer Tropsch processes are also well known to those of skill in the art. In a Fischer Tropsch process, a hydrocarbon source, preferably natural gas, is converted into synthesis gas. In the Fischer Tropsch synthesis reaction, highly paraffinic higher hydrocarbon products are synthesized from the synthesis gas. In the Fischer Tropsch synthesis reaction, synthesis gas is converted to hydrocarbons by contact with a Fischer Tropsch catalyst under reactive conditions. The products from the Fischer Tropsch synthesis reaction may range from $C_1$ to $C_{200+}$ with a majority in the $C_5$–$C_{100+}$ range. The Fischer Tropsch synthesis reaction can be conducted in a variety of reactor types including, for example, fixed bed reactors containing one or more catalyst beds, slurry reactors, fluidized bed reactors, or a combination of different type reactors. The Fischer Tropsch process may further comprise one or more upgrading steps to upgrade the highly paraffinic hydrocarbons into one or more salable hydrocarbonaceous products.

Preferably, the hydrocarbon synthesis reactions and processes of the present invention are Fischer Tropsch synthesis reactions and Fischer Tropsch processes.

In these hydrocarbon synthesis processes, hydrogen-depleted streams are produced. The hydrogen-depleted streams, for use in the processes of the present invention, may be isolated from one or more of the process steps in a hydrocarbon synthesis process. Combined streams, isolated from one or more of the process steps in a hydrocarbon synthesis process, can provide a low value, hydrogen-depleted stream. Preferably, the hydrogen-depleted stream is isolated from a source selected from the group consisting of (i) a tail gas from a hydrocarbon synthesis reaction unit; (ii) the syngas prior to performing the hydrocarbon synthesis reaction; (iii) a tail gas from an upgrading process; and (iv) combinations thereof. Preferably, at least a portion of the hydrogen-depleted stream is isolated from the tail gas from a hydrocarbon synthesis reaction unit.

The hydrogen-rich stream isolated according to the processes of the present invention may be used for a process selected from the group consisting of (i) upgrading a hydrocarbon product stream from the hydrocarbon synthesis process; (ii) hydrotreating a natural gas stream; (iii) recycling the hydrogen-rich stream to a hydrocarbon synthesis reaction unit; (iv) hydrogen production for uses outside the hydrocarbon synthesis process; (v) rejuvenating a hydrocarbon synthesis reaction catalyst; and (vi) combinations thereof.

Preferably, the processes of the present invention are used to isolate hydrogen-rich streams from streams produced in hydrocarbon synthesis processes, and the hydrogen-rich streams thus isolated are used in the hydrocarbon synthesis processes, thus providing an integrated process. Advantageously, in these integrated processes the hydrogen-rich streams isolated according to the processes of the present invention may be used for a process selected from the group consisting of (i) upgrading a hydrocarbon product stream from the hydrocarbon synthesis process; (ii) hydrotreating a natural gas stream; (iii) recycling the hydrogen-rich stream to a hydrocarbon synthesis reaction unit; (iv) rejuvenating a hydrocarbon synthesis reaction catalyst; and (v) combinations thereof.

Using the hydrogen-rich streams isolated from the hydrocarbon synthesis process in an integrated manner reduces or potentially eliminates hydrogen gas needed from conventional sources. Accordingly, this integrated process is efficient, as well as provides economic advantages.

Fischer Tropsch Process

Preferably, the hydrocarbon synthesis process of the present invention is a Fischer Tropsch process.

In a Fischer Tropsch process, a hydrocarbon source, preferably natural gas, is converted into synthesis gas. The synthesis gas is converted into highly paraffinic higher hydrocarbon products by a Fischer Tropsch synthesis reaction. The Fischer Tropsch process may further comprise one or more upgrading steps to upgrade the highly paraffinic hydrocarbons into one or more salable hydrocarbonaceous products.

In a Fischer Tropsch synthesis reaction, syngas is converted to liquid hydrocarbons by contact with a Fischer Tropsch catalyst under reactive conditions. Typically, methane and optionally heavier hydrocarbons (ethane and heavier, coke, or coal) can be sent through a conventional syngas generator to provide synthesis gas. Generally, synthesis gas contains hydrogen, carbon monoxide, carbon dioxide, and water. If natural gas is the feedstock and the natural gas contains sulfur, the sulfur must be removed from the natural gas because sulfur is a poison to both reforming catalysts and Fischer Tropsch catalysts. Hydrogen is required to remove the sulfur from the natural gas by converting the organic sulfur compounds into $H_2S$.

The presence of nitrogen, halogen, selenium, phosphorus and arsenic contaminants in the syngas is also undesirable. Means for removing these contaminants are well known to those of skill in the art.

If coal or coke is the feedsock, sulfur must also be removed and the sulfur removal is accomplished downstream of the syngas generation unit. Bulk removal of the sulfur is accomplished with solvent absorption processes such as Selexol. ZnO guardbeds are preferred for removing trace quantities of sulfur impurities. Means for removing other contaminants are well known to those of skill in the art.

In the Fischer Tropsch synthesis reaction, contacting a synthesis gas, comprising a mixture of $H_2$ and CO, with a Fischer Tropsch catalyst under suitable temperature and pressure reactive conditions forms liquid and gaseous hydrocarbons. The Fischer Tropsch synthesis reaction is typically conducted at temperatures of about 300–700° F. (149–371° C.), preferably about 400–550° F. (204–228° C.); pressures of about 10–600 psia, (0.7–41 bars), preferably about 30–300 psia, (2–21 bars); and catalyst space velocities of about 100–10,000 cc/g/hr, preferably about 300–3,000 cc/g/hr. Examples of conditions for performing Fischer Tropsch synthesis reactions are well known to those of skill in the art.

The products of the Fischer Tropsch synthesis reaction may range from $C_1$ to $C_{200+}$ with a majority in the $C_5$ to $C_{100+}$ range. The synthesis reaction can be conducted in a variety of reactor types or synthesis reaction units, such as fixed bed reactors containing one or more catalyst beds, slurry reactors, fluidized bed reactors, or a combination of different type reactors. Such synthesis reactions and reactors are well known and documented in the literature.

The slurry Fischer Tropsch synthesis reaction, which is preferred in the practice of the invention, utilizes superior heat (and mass) transfer characteristics for the strongly exothermic synthesis reaction and is able to produce relatively high molecular weight, paraffinic hydrocarbons when using a cobalt catalyst. In the slurry synthesis reaction, a syngas comprising a mixture of hydrogen and carbon monoxide is bubbled up as a third phase through a slurry which comprises a particulate Fischer Tropsch type hydrocarbon synthesis catalyst dispersed and suspended in a slurry liquid comprising hydrocarbon products of the synthesis reaction which are liquid under the reaction conditions. The mole ratio of the hydrogen to the carbon monoxide may broadly range from about 0.5 to about 4, but is more typically within the range of from about 0.7 to about 2.75 and preferably from about 0.7 to about 2.5. A particularly preferred Fischer Tropsch synthesis reaction is taught in EP0609079, also completely incorporated herein by reference for all purposes.

In general, Fischer Tropsch catalysts contain a Group VIII transition metal on a metal oxide support. The catalysts may also contain a noble metal promoter(s) and/or crystalline molecular sieves. Suitable Fischer Tropsch catalysts comprise one or more of Fe, Ni, Co, Ru and Re, with cobalt being preferred. A preferred Fischer Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Suitable support materials include alumina, silica, magnesia and titania or mixtures thereof. Preferred supports for cobalt containing catalysts comprise titania. Useful catalysts and their preparation are known and illustrated in U.S. Pat. No. 4,568,663, which is intended to be illustrative but non-limiting relative to catalyst selection.

Certain catalysts are known to provide chain growth probabilities that are relatively low to moderate, and the synthesis reaction products include a relatively high proportion of low molecular ($C_{2-8}$) weight olefins and a relatively low proportion of high molecular weight ($C_{30+}$) waxes. Certain other catalysts are known to provide relatively high chain growth probabilities, and the synthesis reaction products include a relatively low proportion of low molecular ($C_{2-8}$) weight olefins and a relatively high proportion of high molecular weight ($C_{30+}$) waxes. Such catalysts are well known to those of skill in the art and can be readily obtained and/or prepared.

The product from a Fischer Tropsch synthesis reaction contains predominantly paraffins. The product from a Fischer Tropsch synthesis reaction generally includes a light reaction product and a waxy reaction product. A tail gas is also produced. The light reaction product (i.e., the condensate fraction) includes hydrocarbons boiling below about 700° F. (e.g., through middle distillate fuels), largely in the $C_5$–$C_{20}$ range, with decreasing amounts up to about $C_{30}$. The waxy reaction product (i.e., the wax fraction) includes hydrocarbons boiling above about 600° F. (e.g., vacuum gas oil through heavy paraffins), largely in the $C_{20+}$ range, with decreasing amounts down to $C_{10}$.

Both the light reaction product and the waxy product are substantially paraffinic. The waxy product generally comprises greater than 70 weight % normal paraffins, and often greater than 80 weight % normal paraffins. The light reaction product comprises paraffinic products with a significant proportion of alcohols and olefins. In some cases, the light reaction product may comprise as much as 50 weight %, and even higher, alcohols and olefins. The tail gas comprises CO, $H_2$, $CO_2$, $H_2O$ (g), and gaseous $C_1$–$C_5$ hydrocarbons. The tail gas from the Fischer Tropsch synthesis reaction unit is a hydrogen-depleted gas stream according to the present invention. Preferably, the tail gas from the Fischer Tropsch synthesis reactor is used in the processes of the present invention.

In the Fischer Tropsch process, the reaction products from the Fischer Tropsch synthesis reaction may be upgraded by one or more upgrading process steps. Accordingly, the Fischer Tropsch process may comprise one or more upgrading steps to upgrade the reaction products into one or more salable hydrocarbonaceous products. Hydrogen may be required to upgrade the products. Hydrogen may also be used to saturate olefins that are contained in various recycle streams in the Fischer Tropsch process.

Uses for the Hydrogen-Rich Stream

The hydrogen-rich gas isolated from the processes of the present invention comprises greater than 90 vol. % hydrogen, preferably greater than 95 vol. % hydrogen, and more preferably greater than 99 vol. % hydrogen. Accordingly, the hydrogen-rich gas may be used for any purpose for which high purity hydrogen is needed.

By way of example, the hydrogen-rich gas produced from the processes of the present invention may be used for upgrading hydrocarbon product streams from hydrocarbon synthesis processes. The hydrogen-rich gas may be used for hydrotreating a natural gas stream. The hydrogen-rich gas may used as a feed to a hydrocarbon synthesis reaction unit. As such, the hydrogen-rich gas may be recycled within the hydrocarbon synthesis process in which it is produced to the hydrocarbon synthesis reaction unit. The hydrogen-rich gas may be used to rejuvenate a hydrocarbon synthesis reaction catalyst. The hydrogen-rich gas may used for hydrogen production for uses outside the hydrocarbon synthesis process. If the hydrogen-rich gas produced is not used within the hydrocarbon synthesis process, it may be appropriately shipped to other locations for use in other processes which require high purity hydrogen.

Preferably, the hydrogen-rich gas isolated according to the processes of the present invention is used in hydrocarbon synthesis processes from which it is isolated, thus providing an integrated process. As such, the hydrogen-rich gas may be used for any purpose in the hydrocarbon synthesis processes for which hydrogen-rich gas is needed. Preferably, the hydrogen-rich gas is used to upgrade the hydrocarbon product stream produced in the hydrocarbon synthesis process; hydrotreat the natural gas stream used in making the synthesis gas; recycle to the hydrocarbon synthesis reaction unit; rejuvenate a hydrocarbon synthesis reaction catalyst; or combinations thereof. Using the hydrogen-rich gas isolated from the hydrocarbon synthesis process in the hydrocarbon synthesis process reduces or potentially eliminates hydrogen gas needed from conventional sources. Accordingly, this integrated process is efficient, as well as provides economic advantages.

Rejuvenating the Hydrocarbon Synthesis Reaction Catalyst

According to the processes of the present invention, the hydrogen-rich stream may be used for rejuvenation of a hydrocarbon synthesis reaction catalyst. During the hydrocarbon synthesis reaction operation, the hydrocarbon synthesis reaction catalyst loses activity (deactivates) by deactivating species in the syngas and deactivating species resulting from the synthesis reaction. These deactivating species include, for example, nitrogen or nitrogen containing compounds. This deactivation is reversible and catalytic activity is restored (i.e., the catalyst is rejuvenated) by contacting the deactivated catalyst with hydrogen. The activity of a hydrocarbon synthesis reaction catalyst in a slurry reactor can be intermittently or continuously rejuvenated by contacting the slurry with a hydrogen-rich gas to form a catalyst rejuvenated slurry either in-situ in the hydrocarbon synthesis reactor or in an external rejuvenation vessel. This type of rejuvenation process is disclosed in, for example, U.S. Pat. Nos. 5,260,239; 5,268,344; and 5,283,216.

Upgrading Processes

According to the present invention hydrocarbon product streams may be upgraded by a process comprising contacting the hydrocarbon product stream with a hydrogen-rich stream, wherein the hydrogen-rich stream is isolated from a stream comprising less than 40% vol. hydrogen.

Hydrocarbon product streams isolated from hydrocarbon synthesis processes frequently require upgrading through hydoconversion processes/hydroprocessing. Fischer Tropsch products, while they are highly paraffinic, are typically upgraded by one or more hydroconversion processes to provide more valuable products. Examples of hydroconversion processes include hydrotreating, hydrocracking, hydrogenation, hydroisomerization dewaxing, and hydrofinishing.

In addition to product streams, the initial feedstock to the syngas generator as well as recycle streams may require upgrading. By way of example, the natural gas feed to the syngas generator may require hydrotreating to remove sulfur and sulfur containing compounds. Various recycle streams in the hydrocarbon synthesis process may contain olefins that need to be saturated by hydrotreating.

Hydroconversion processes or hydroprocessing, in general, is well known to those of skill in the art. Among the purposes of the hydroprocessing can be reducing, or preferably completely removing, heteroatoms such as nitrogen and sulfur. Further, hydroprocessing may reduce, or completely remove, olefins. Moreover, hydroprocessing may increase the ratio of iso/normal paraffins in a distillate product. Additionally, hydroprocessing may increase the production of distillate product by converting heavy species.

Typical hydroprocessing conditions vary over a wide range and are well known to those of skill in the art.

Hydrotreating

Hydrotreating can be use to reduce or preferably completely remove heteroatoms, such as nitrogen and sulfur. Typical hydrotreating conditions are well known to those of skill in the art and are described in, by way of example, U.S. Pat. No. 6,179,995, the contents of which are herein incorporated by reference in their entirety.

Hydrotreating conditions include a reaction temperature between 400° F.–900° F. (204° C.–482° C.), preferably 650° F.–850° F. (343° C.–454° C.); a pressure between 500 to 5000 psig (pounds per square inch gauge) (3.5–34.6 MPa), preferably 1000 to 3000 psig (7.0–20.8 MPa); a feed rate (LHSV) of 0.5 $hr^{-1}$ to 20 $hr^{-1}$ (v/v); and overall hydrogen consumption 300 to 2000 scf per barrel of liquid hydrocarbon feed (53.4–356 $m^3$ $H_2/m^3$ feed). The hydrotreating catalyst for the beds will typically be a composite of a Group VI metal or compound thereof, and a Group VIII metal or compound thereof supported on a porous refractory base such as alumina. Examples of hydrotreating catalysts are alumina supported cobalt—molybdenum, nickel sulfide, nickel—tungsten, cobalt—tungsten and nickel—molybdenum. Typically such hydrotreating catalysts are presulfided.

Hydrocracking

Hydrocracking may be conducted according to conventional methods known to those of skill in the art. Typical hydrocracking conditions are described in, by way of example, U.S. Pat. No. 6,179,995, the contents of which are herein incorporated by reference in their entirety. Hydrocracking is used to effect a boiling range conversion of a waxy hydrocarbon feed. Typically, hydrocracking is a process of breaking larger carbon molecules into smaller ones. It may be effected by contacting the particular fraction or combination of fractions, with hydrogen in the presence of a suitable hydrocracking catalyst at temperatures in the range of from about 600 to 900° F. (316 to 482° C.), preferably 650 to 850° F. (343 to 454° C.), and pressures in the range of from about 200 to 4000 psia (13 to 272 atm), preferably 500 to 3000 psia (34 to 204 atm) using space velocities based on the hydrocarbon feedstock of about 0.1 to 10 $hr^{-1}$, preferably 0.25 to 5 $hr^{-1}$; and hydrogen consumption 500 to 2500 scf per barrel of liquid hydrocarbon feed (89.1–445 $m^3$ $H_2/m^3$ feed).

The hydrocracking catalyst generally comprises a cracking component, a hydrogenation component and a binder. Such catalysts are well known in the art. The cracking component may include an amorphous silica/alumina phase and/or a zeolite, such as a Y-type or USY zeolite. The binder is generally silica or alumina. The hydrogenation component will be a Group VI, Group VII, or Group VIII metal or oxides or sulfides thereof, preferably one or more of molybdenum, tungsten, cobalt, or nickel, or the sulfides or oxides thereof. If present in the catalyst, these hydrogenation components generally make up from about 5% to about 40% by weight of the catalyst. Alternatively, platinum group metals, especially platinum and/or palladium, may be present as the hydrogenation component, either alone or in combination with the base metal hydrogenation components molybdenum, tungsten, cobalt, or nickel. If present, the platinum group metals will generally make up from about 0.1% to about 2% by weight of the catalyst.

Hydrogenation

The conditions of hydrogenation are well known in the industry and include temperatures above ambient and pressures greater than atmospheric. Preferable conditions for hydrogenation include a temperature between 300 and 800° F., most preferably between 400 and 600° F., a pressure between 50 and 2000 psig, most preferably between 100 and 500 psig, a liquid hourly space velocity (LHSV) between 0.2 and 10 $hr^{-1}$, most preferably between 1.0 and 3.0 $hr^{-1}$, and a gas rate between 500 and 10,000 SCFB, most preferably between 1000 and 5000 SCFB.

The catalysts used for hydrogenation are those typically used in hydrotreating, but non-sulfided catalysts containing Pt and/or Pd are preferred, and it is preferred to disperse the Pt and/or Pd on a support, such as alumina, silica, silica-alumina, or carbon. The preferred support is silica-alumina.

Hydroisomerization Dewaxing

According to the present invention, a waxy hydrocarbon feedstock can be subjected to hydroisomerization in a hydroisomerization zone.

Hydroisomerization dewaxing is intended to improve the cold flow properties of a lubricant base oil by the selective addition of branching into the molecular structure. Hydroisomerization dewaxing ideally will achieve high conversion levels of waxy feed to non-waxy iso-paraffins while at the same time minimizing the conversion by cracking.

Typical hydroisomerization conditions are well known to those of skill in the art and can vary widely. Hydroisomerization processes are typically carried out at a temperature between 200° F. and 700° F., preferably 300° F. to 650° F., with a LHSV between 0.1 and 10 $hr^{-1}$, preferably between 0.25 and 5 $hr^{-1}$. Hydrogen is employed such that the mole ratio of hydrogen to hydrocarbon is between 1:1 and 15:1. Catalysts useful for isomerization processes are generally bifunctional catalysts that include a dehydrogenation/hydrogenation component and an acidic component. The acidic component may include one or more of amorphous oxides such as alumina, silica or silica-alumina; a zeolitic material such as zeolite Y, ultrastable Y, SSZ-32, Beta zeolite, mordenite, ZSM-5 and the like, or a non-zeolitic molecular sieve such as SAPO-11, SAPO-31 and SZPO-41. The acidic component may further include a halogen component, such as fluorine. The hydrogenation component may be selected from the Group VIII noble metals such as platinum and/or palladium, from the Group VIII non-noble metals such as nickel and tungsten, and from the Group VI metals such as cobalt and molybdenum. If present, the platinum group metals will generally make up from about 0.1% to about 2% by weight of the catalyst. If present in the catalyst, the non-noble metal hydrogenation components generally make up from about 5% to about 40% by weight of the catalyst.

Hydrofinishing

The lubricant base oil products produced from the hydrocarbon synthesis processes may be hydrofinished in order to improve product quality and stability. During hydrofinishing, overall LHSV is about 0.25 to 2.0 hr$^{-1}$, preferably about 0.5 to 1.0 hr$^{-1}$. The hydrogen partial pressure is greater than 200 psia, preferably ranging from about 500 psia to about 2000 psia. Hydrogen recirculation rates are typically greater than 50 SCF/Bbl, and are preferably between 1000 and 5000 SCF/Bbl. Temperatures range from about 300° F. to about 750° F., preferably ranging from 450° F. to 600° F.

Suitable hydrofinishing catalysts include noble metals from Group VIIIA (according to the 1975 rules of the International Union of Pure and Applied Chemistry), such as platinum or palladium on an alumina or siliceous matrix, and unsulfided Group VIIIA and Group VIB, such as nickel-molybdenum or nickel-tin on an alumina or siliceous matrix. U.S. Pat. No. 3,852,207 describes a suitable noble metal catalyst and mild conditions. Other suitable catalysts are described, for example, in U.S. Pat. No. 4,157,294, and U.S. Pat. No. 3,904,513. The non-noble metal (such as nickel-molybdenum and/or tungsten, and at least about 0.5, and generally about 1 to about 15 weight percent of nickel and/or cobalt determined as the corresponding oxides. The noble metal (such as platinum) catalyst contains in excess of 0.01 percent metal, preferably between 0.1 and 1.0 percent metal. Combinations of noble metals may also be used, such as mixtures of platinum and palladium.

Illustrative Embodiments

The illustrative embodiments are preformed with a reverse-selective membrane having an active-layer thickness of 1.0 micron. The membrane exhibits permeability (barrer) to various components of the initial gas feed as summarized in Table I below.

TABLE I

| Gas Component | Permeability (barrer) |
|---|---|
| $CO_2$ | 185 |
| $H_2$ | 18 |
| $CH_4$ | 9.2 |
| $N_2$ | 2.7 |
| CO | 3 |
| $C_2H_6$ | 23 |
| $C_3H_8$ | 46 |
| $C_4H_{10}$ | 92 |
| $H_2O$ | 1748 |

FIG. 1 represents one embodiment of a process for providing a hydrogen-rich stream. The process comprises performing a hydrocarbon synthesis reaction using syngas and isolating a tail gas from the hydrocarbon synthesis reaction unit. Preferably, the hydrocarbon synthesis reaction is a Fischer Tropsch synthesis reaction. The tail gas (1) is contacted with a reverse-selective membrane that is selectively permeable to $CO_2$ (100) providing a $CO_2$-enriched permeate (2) and a hydrogen-containing retentate (3). Advantageously, the hydrogen-containing retentate (3) remains at elevated pressure since it does not pass through the membrane and thus does not require re-pressuring to complete the isolation process. Preferably, the hydrogen-containing retentate (3) is at a pressure of ≧about 100 psig, and more preferably ≧about 200 psig.

The hydrogen-containing retentate (3) is heated using heat exchanger (200). Water vapor (4) is added in excess to the hydrogen-containing retentate (3) to provide a combined stream (5). The combined stream (5) is fed into a water gas shift reactor (300). In the water gas shift reactor (300) CO in the combined gas stream (5) reacts with water vapor in the presence of a shift catalyst at reaction conditions effective to form a mixture of hydrogen and carbon dioxide, i.e., the hydrogen-containing stream (6).

The hydrogen-containing stream (6) exits the water gas shift reactor (300) and is cooled through use of heat exchanger (200) and heat exchanger (400), with heat exchanger (400) using cooling water. The hydrogen-containing stream (6) is then passed through a vapor-liquid separator (500) to remove water (11) and to provide the hydrogen-containing stream (7). The hydrogen-containing stream (7) is passed through a pressure swing adsorption unit (600) to provide a hydrogen-rich stream (10) and an absorbed gas stream (8). The absorbed gas stream (8) comprises CO, $CO_2$, $H_2O_{(g)}$, gaseous hydrocarbons, and residual hydrogen and may be combined with the $CO_2$-enriched permeate (2) to form a combined gas stream (9) that may be burned as fuel. The hydrogen-rich stream (10) comprises greater than 90 vol. % hydrogen, preferably greater than 95 vol. % hydrogen, and more preferably greater than 99 vol. % hydrogen, and may be used for any purpose for which high purity hydrogen is needed.

Table II in FIG. 2 provides a stream summary of the gas streams from FIG. 1. The stream summary has been generated by computer modeling.

Figure 3:
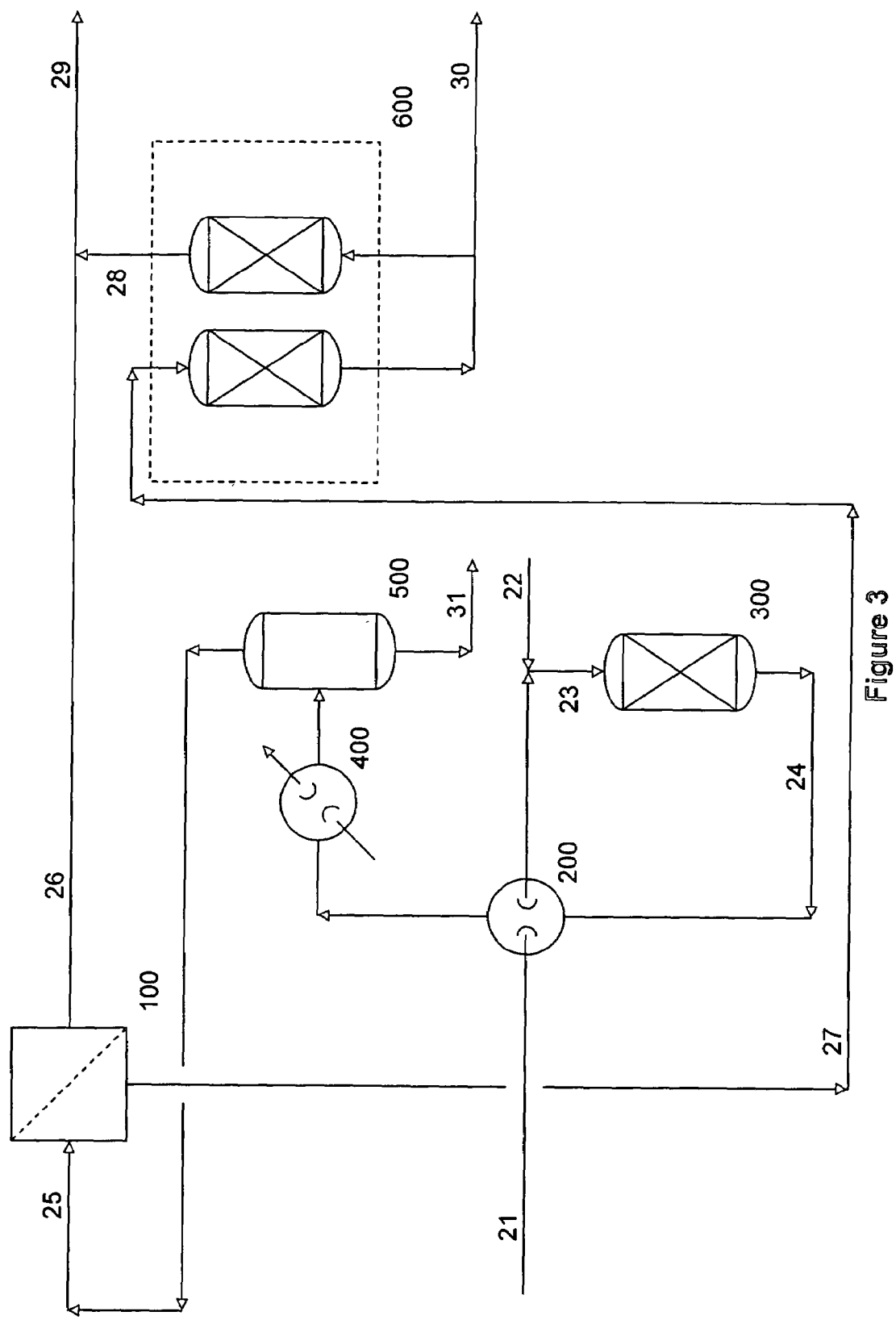
FIG. 3 is a schematic flow diagram of a second embodiment of the invention.

FIG. 3 represents another embodiment of a process for providing a hydrogen-rich stream according to the present invention. The process comprises performing a hydrocarbon synthesis reaction using syngas and isolating a tail gas from the hydrocarbon synthesis reaction unit. Preferably, the hydrocarbon synthesis reaction is a Fischer Tropsch synthesis reaction. The tail gas (21) is heated with heat exchanger (200). The tail gas (21) is then combined with water vapor (22) with the water vapor (22) added in excess to provide a combined stream (23). The combined stream (23) is fed into a water gas shift reactor (300). In the water gas shift reactor (300) CO in the combined gas stream (23) reacts with water vapor in the presence of a shift catalyst at reaction conditions effective to form a mixture of hydrogen and carbon dioxide, i.e., the hydrogen-containing stream (24).

The hydrogen-containing stream (24) exits the water gas shift reactor (300) and is cooled through use of heat exchanger (200) and heat exchanger (400), with heat exchanger (400) using cooling water. The hydrogen-containing stream (24) is then passed through a vapor-liquid separator (500) to remove water (31) and to provide the hydrogen-containing stream (25).

The hydrogen-containing stream (25) is contacted with a reverse-selective membrane that is selectively permeable to $CO_2$ (100) providing a $CO_2$-enriched permeate (26) and a hydrogen-containing retentate (27). Advantageously, the hydrogen-containing retentate (27) remains at elevated pressure since it does not pass through the membrane and thus does not require re-pressuring to complete the isolation process. Preferably, the hydrogen-containing retentate (27) is at a pressure of ≧about 100 psig, and more preferably ≧about 200 psig.

The hydrogen-containing retentate (27) is passed through a pressure swing adsorption unit (600) to provide a hydrogen-rich stream (30) and an absorbed gas stream (28). The absorbed gas stream (28) comprises CO, $CO_2$, $H_2O_{(g)}$, gaseous hydrocarbons, and residual hydrogen and may be combined with the $CO_2$-enriched permeate (26) to form a combined gas stream (29) that may be burned as fuel. The hydrogen-rich stream (30) comprises greater than 90 vol. % hydrogen, preferably greater than 95 vol. % hydrogen, and more preferably greater than 99 vol. % hydrogen, and may be used for any purpose for which high purity hydrogen is needed.

Table III in FIG. 4 provides the stream summary of the gas streams from FIG. 3. The stream summary has been generated by computer modeling.

While the invention has been described in detail and with reference to specific embodiments thereof, it will be apparent to one skilled in the art that various changes and modifications can be made without departing from the spirit and scope thereof.

What is claimed is:

1. An integrated Fischer Tropsch process comprising:
    a) performing Fischer Tropsch process using syngas to provide a hydrocarbon product stream and a hydrogen-depleted stream;
    b) isolating a hydrogen-rich stream from the hydrogen-depleted stream by a process comprising contacting the hydrogen-depleted stream with a reverse-selective membrane to provide a $CO_2$-enriched permeate and a hydrogen-containing retentate; and
    c) upgrading at least a portion of the hydrocarbon product stream by reacting it with at least a portion of the hydrogen-rich stream.

2. The integrated process according to claim 1, wherein the hydrogen-depleted stream comprises less than 40 vol. % hydrogen and the hydrogen-rich stream comprises greater than 95 vol. % hydrogen.

3. The integrated process according to claim 2, wherein the hydrogen-depleted stream comprises less than 35 vol. % hydrogen and the hydrogen-rich stream comprises greater than 99 vol. % hydrogen.

4. The integrated process according to claim 1, wherein step b) further comprises
    (i) passing the hydrogen-containing retentate through a water gas shift reactor to provide a hydrogen-containing stream; and
    (ii) passing the hydrogen-containing stream through a pressure swing adsorption unit to provide the hydrogen-rich stream.

5. The integrated process according to claim 1, wherein step b) further comprises
    (i) passing the hydrogen-depleted stream through a water gas shift reactor to provide a hydrogen-containing stream prior to contacting the hydrogen-depleted stream with the reverse-selective membrane;
    (ii) contacting the hydrogen-containing stream with the reverse-selective membrane to provide the $CO_2$-enriched permeate and the hydrogen-containing retentate; and
    (iii) passing the hydrogen-containing retentate through a pressure swing adsorption unit to provide the hydrogen-rich stream.

6. The integrated process according to claim 1, wherein the hydrogen-depleted stream is isolated from a source selected from the group consisting of (i) a tail gas from a Fischer Tropsch synthesis reaction unit; (ii) the syngas prior to performing the Fischer Tropsch synthesis reaction; (iii) a tail gas from an upgrading process; and (iv) combinations thereof.

7. The integrated process according to claim 1, wherein the hydrogen-containing retentate is at a pressure of $\geq$ about 100 psig.

8. The process according to claim 4, wherein the process further comprises passing the hydrogen-containing stream through a vapor-liquid separator to remove water after the water gas shift reaction.

9. The process according to claim 5, wherein the process further comprises passing the hydrogen-containing stream through a vapor-liquid separator to remove water after the water gas shift reaction.

10. The process according to claim 1, wherein the process comprises using a portion of the hydrogen-rich stream for a process selected from the group consisting of (i) hydrotreating a natural gas stream; (ii) recycling the hydrogen-rich stream to a hydrocarbon synthesis reaction unit; (iii) hydrogen production for uses outside the hydrocarbon synthesis process; (iv) rejuvenating a hydrocarbon synthesis reaction catalyst; and (v) combinations thereof.

11. The process according to claim 6, wherein the hydrogen-depleted stream comprises less than 35 vol. % hydrogen.

* * * * *